(12) United States Patent
Chowdhary et al.

(10) Patent No.: US 11,361,325 B2
(45) Date of Patent: *Jun. 14, 2022

(54) DYNAMIC MANAGEMENT OF A CUSTOMER LIFE-CYCLE VALUE

(71) Applicant: INTERNATIONAL BUSINESS MACHINES CORPORATION, Armonk, NY (US)

(72) Inventors: Pawan Chowdhary, San Jose, CA (US); Markus Ettl, Ossining, NY (US); Donald Keefer, Raleigh, NC (US); Gabriel Toma, Toronto (CA); Zhengliang Xue, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/804,078

(22) Filed: Nov. 6, 2017

(65) Prior Publication Data

US 2019/0005514 A1    Jan. 3, 2019

Related U.S. Application Data

(63) Continuation of application No. 15/637,395, filed on Jun. 29, 2017, now Pat. No. 11,295,320.

(51) Int. Cl.
*G06Q 30/02* (2012.01)
*G06Q 10/06* (2012.01)
*G06Q 30/00* (2012.01)

(52) U.S. Cl.
CPC ......... *G06Q 30/02* (2013.01); *G06Q 10/0637* (2013.01); *G06Q 30/0202* (2013.01); *G06Q 30/00* (2013.01)

(58) Field of Classification Search
CPC .... G06Q 30/02; G06Q 30/0202; G06Q 30/00; G06Q 10/0637
See application file for complete search history.

(56) References Cited

U.S. PATENT DOCUMENTS 6,868,392 B1 * 3/2005 Ogasawara ...... G06Q 10/06315
705/7.25
6,915,270 B1 7/2005 Young et al.
(Continued)

FOREIGN PATENT DOCUMENTS

WO     2018064662 A1     4/2018
WO     WO-2018069817 A1 *  4/2018 ............. G06Q 10/04

OTHER PUBLICATIONS

Lawrence, Analytics-driven solutions for customer targeting and sales-force allocation, Jun. 3, 2014, p. 1-20.*

(Continued)

*Primary Examiner* — Jerry O'Connor
*Assistant Examiner* — James Webb
(74) *Attorney, Agent, or Firm* — Cantor Colburn LLP; Joseph Petrokaitis

(57) ABSTRACT

Systems, methods, and computer-readable media are disclosed for identifying customers having associated opportunities for improved growth and/or profitability with respect to product or service offerings and determining investment solutions that enhance the probability that the customers transition to the higher growth/profitability opportunities. Prior customer transactions are segmented based on segmentation criteria and used to generate a transaction graph. The nodes of the transaction graph represent the segmented transactions and client transaction paths between the nodes represent potential customer life-cycle trajectories. The transaction graph can be used to identify high-value penetration opportunities.

6 Claims, 4 Drawing Sheets

(56) References Cited

U.S. PATENT DOCUMENTS

| | | |
|---|---|---|
| 7,801,761 B2 | 9/2010 | Varadarajan et al. |
| 8,195,527 B2 | 6/2012 | Chowdhary et al. |
| 8,352,355 B2 | 1/2013 | Ettl et al. |
| 8,527,322 B2 | 9/2013 | Ettl et al. |
| 9,111,278 B1 | 8/2015 | Barton et al. |
| 2002/0107731 A1 | 8/2002 | Teng |
| 2002/0198775 A1 | 12/2002 | Ryan |
| 2004/0128150 A1 | 7/2004 | Lundegren |
| 2005/0138566 A1 | 6/2005 | Muller et al. |
| 2005/0171839 A1 | 8/2005 | Corriere |
| 2005/0171910 A1 | 8/2005 | Wu et al. |
| 2007/0233586 A1* | 10/2007 | Liu ................ G06Q 30/02 705/35 |
| 2010/0049538 A1* | 2/2010 | Frazer .............. G06Q 30/02 705/14.4 |
| 2010/0094837 A1 | 4/2010 | O'Sullivan et al. |
| 2010/0121666 A1 | 5/2010 | Niazi |
| 2011/0071950 A1 | 3/2011 | Ivanovic |
| 2012/0197758 A1* | 8/2012 | Zhong ............... G06Q 30/02 705/26.35 |
| 2015/0193855 A1* | 7/2015 | Costelloe .......... G06Q 30/0631 705/14.53 |
| 2017/0061480 A1* | 3/2017 | Zhou ................ G06Q 30/0254 |

OTHER PUBLICATIONS

List of IBM Patents or Patent Applications Treated as Related; (Appendix P), Filed Nov. 6, 2017; 2 pages.

Pawan Chowdhary et al., "Dynamic Management of a Customer Life-Cycle Value", U.S. Appl. No. 15/637,395, filed Jun. 29, 2017.

Jiang et al., "Optimizing E-tailer Profits and Customer Savings: Pricing Multistage Customized Online Bundles", Marketing Science, vol. 30, No. 4, Jul.-Aug. 2011, pp. 737-752.

Lawrence, R. et al., "Analytics-driven solutions for customer targeting and sales-force allocation," Jun. 3, 2014, Research Gate, p. 1-20.

* cited by examiner

DYNAMIC MANAGEMENT OF A CUSTOMER LIFE-CYCLE VALUE

DOMESTIC PRIORITY

This application is a continuation of and claims priority from U.S. patent application Ser. No. 15/637,395, filed on Jun. 29, 2017 entitled "DYNAMIC MANAGEMENT OF A CUSTOMER LIFE-CYCLE VALUE," the content of which is incorporated herein by reference in its entirety.

BACKGROUND

The present invention relates in general to dynamic management of a customer life-cycle value, and more specifically, to using a transaction graph data structure to learn client value from historical transactions and determine opportunities for client penetration into higher-value product or service offerings.

A life-cycle value of a customer may indicate an expected trajectory of growth and profitability for the customer over a period of time. The life-cycle value of a customer may be impacted by historical behavior of the customer such as historical product or service offerings selected by the customer.

SUMMARY

Embodiments of the invention are directed to a method for identifying a client penetration opportunity. A non-limiting example of the method includes segmenting historical client transactions, determining one or more target parameters, and generating a transaction graph comprising nodes representative of the segmented historical client transactions. The transaction graph further includes client transaction paths between the nodes. The method further includes determining a respective transition probability for each client transaction path in at least a subset of the client transaction paths, and ranking penetration opportunities associated with the at least a subset of the client transaction paths based at least in part on each respective transition probability. The client penetration opportunity is then selected from the ranked penetration opportunities.

Embodiments of the invention are directed to a system. A non-limiting example of the system includes at least one memory storing computer-executable instructions and at least one processor configured to access the at least one memory and execute the computer-executable instructions to perform a set of operations. The operations include segmenting historical client transactions, determining one or more target parameters, and generating a transaction graph comprising nodes representative of the segmented historical client transactions. The transaction graph further includes client transaction paths between the nodes. The operations further include determining a respective transition probability for each client transaction path in at least a subset of the client transaction paths, and ranking penetration opportunities associated with the at least a subset of the client transaction paths based at least in part on each respective transition probability. The client penetration opportunity is then selected from the ranked penetration opportunities.

Embodiments of the invention are directed to a computer program product. A non-limiting example of the computer program product includes a computer readable storage medium having computer readable program instructions embodied therewith, the program instructions executable by a processing circuit to cause the processing circuit to perform a method. A non-limiting example of the method includes segmenting historical client transactions, determining one or more target parameters, and generating a transaction graph comprising nodes representative of the segmented historical client transactions. The transaction graph further includes client transaction paths between the nodes. The method further includes determining a respective transition probability for each client transaction path in at least a subset of the client transaction paths, and ranking penetration opportunities associated with the at least a subset of the client transaction paths based at least in part on each respective transition probability. The client penetration opportunity is then selected from the ranked penetration opportunities.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the invention and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
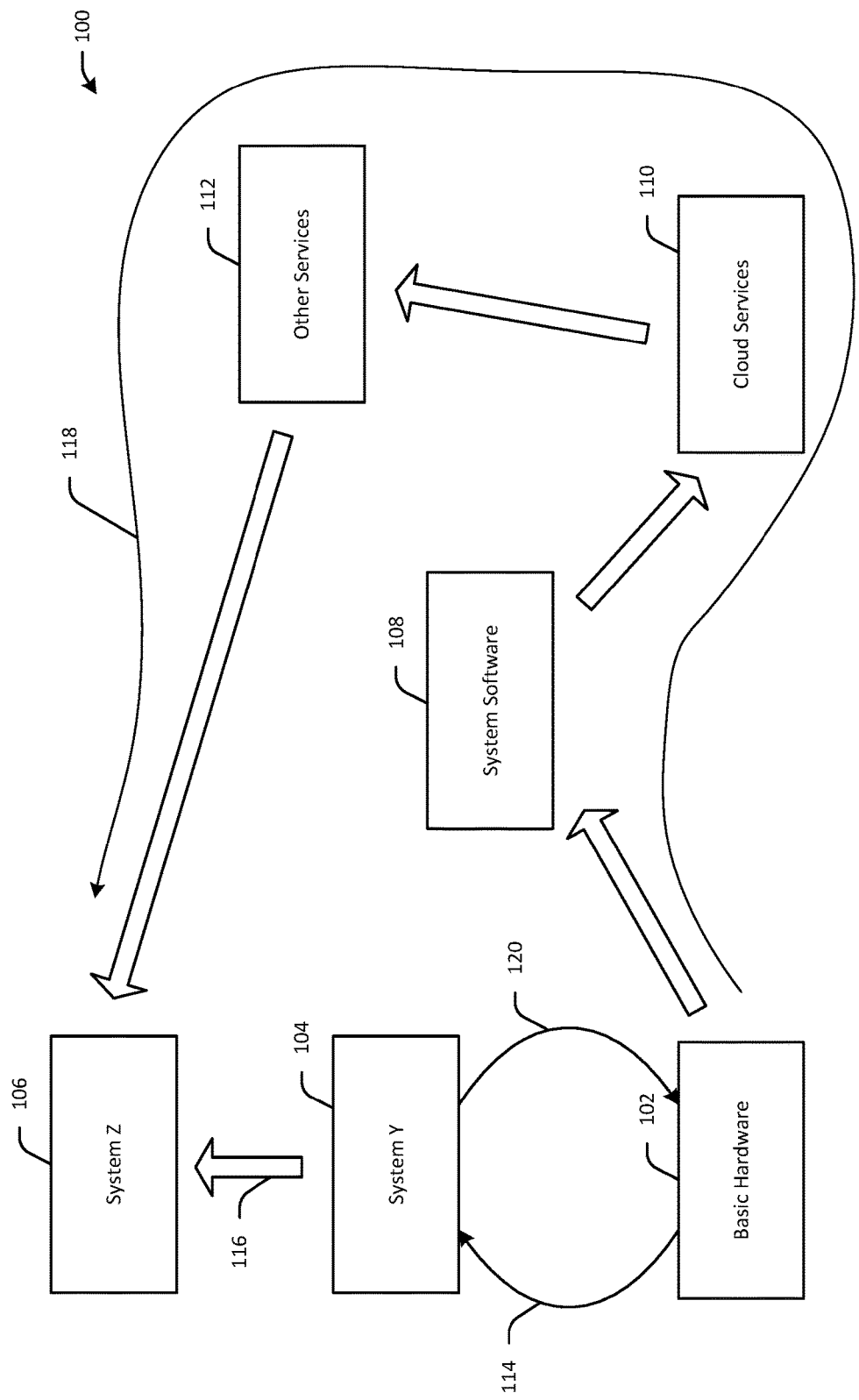
FIG. 1 is a schematic depiction of a transaction graph in accordance with one or more example embodiments of the disclosure.

Example embodiments of the invention include, among other things, systems, methods, computer-readable media, techniques, and methodologies for identifying customers having associated opportunities for improved growth and/or profitability with respect to product or service offerings and determining investment solutions that enhance the probability that the customers transition to the higher growth/profitability opportunities. In example embodiments of the disclosure, customer requests for quotes (RFQs) and completed transactions are segmented based on segmentation criteria. The segmentation criteria may be evaluated based on input data such as sales data, production/service data, client data, and/or environment data and may call for segmentation based on client industry; product or service offerings relating to the RFQs and/or completed transactions; transaction amounts; or the like.

A transaction graph is then generated that models the segmented groups of transactions as nodes within the graph. In addition, client transaction paths representative of actual or potential client purchase trajectories are modeled as paths between nodes in the transaction graph. The client transaction paths are then classified in accordance with classification criteria, and at least a subset of the client transaction paths that are indicative of high-value penetration opportunities are identified. A respective transition probability is determined for each such high-value penetration opportunity. The transition probability may be a probabilistic measure of the likelihood that the customer transitions from a current product or service offering to a different category of product or service offering that represents an upgrade or a diversification over the existing product or service offering or a penetration into a new market space. While opportunities for increasing growth and/or profitability of a customer during the customer's life-cycle may be referred to herein as penetration opportunities, it should be appreciated that a penetration opportunity may include, in addition to or as an alternative to penetration into a new market space, upgrades or diversifications to product or service offerings.

The high-value penetration opportunities are then ranked based on the corresponding transition probabilities. In certain example embodiments, a highest ranked penetration opportunity is selected, and an investment solution relating to the selected penetration opportunity is determined. More specifically, the respective transition probability associated with each opportunity may be linked to a set of client conditions. The client conditions may include, without limitation, a relationship condition indicative of the customer's relationship with the seller; a finance condition indicative of the customer's financial condition; a technology condition indicative of the customer's technology resources; and an environment condition indicative of the industry segment in which the customer operates. Each such client condition may be evaluated based on corresponding data that includes metrics indicative of the client condition. For the relationship condition, for example, data indicative of the duration of the relationship between the customer and the seller, data indicative of the customer's satisfaction with the seller, data indicative of the frequency of the customer's transactions, etc. may be evaluated.

The investment solution that is generated for the selected penetration opportunity may include a recommendation to modify one or more client conditions linked to the selected penetration opportunity. For example, the investment solution may include a recommendation to the seller to provide a loan, a discount, or another type of financial incentive to improve the financial condition of the customer, and thus, increase the probability that the customer transitions to a higher-value product or service offering in accordance with the selected penetration opportunity. As another non-limiting example, the investment solution may include a recommendation to increase an investment in technology resources of the customer to increase the transition probability. As yet another non-limiting example, the investment solution may include a recommendation to offer a promotion of a higher-value product or service offering to incentivize the customer to continue along a desired life-cycle trajectory leading to a target growth and/or profitability for the seller with respect to the customer.

Figure 2:
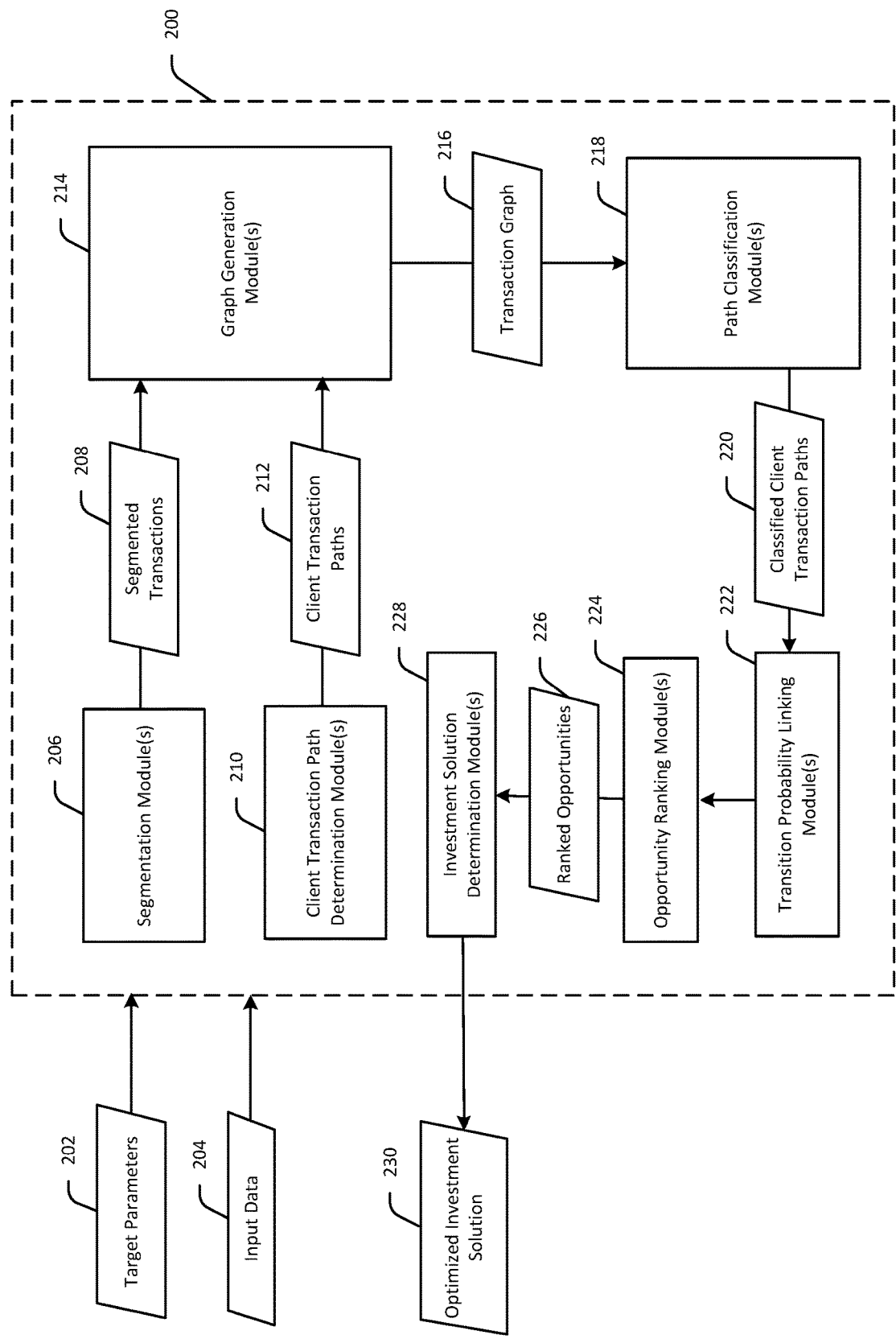
FIG. 2 is a schematic block diagram illustrating various components of a system configured to determine an optimized investment solution with respect to an identified client penetration opportunity in accordance with one or more example embodiments of the disclosure.
Figure 3:
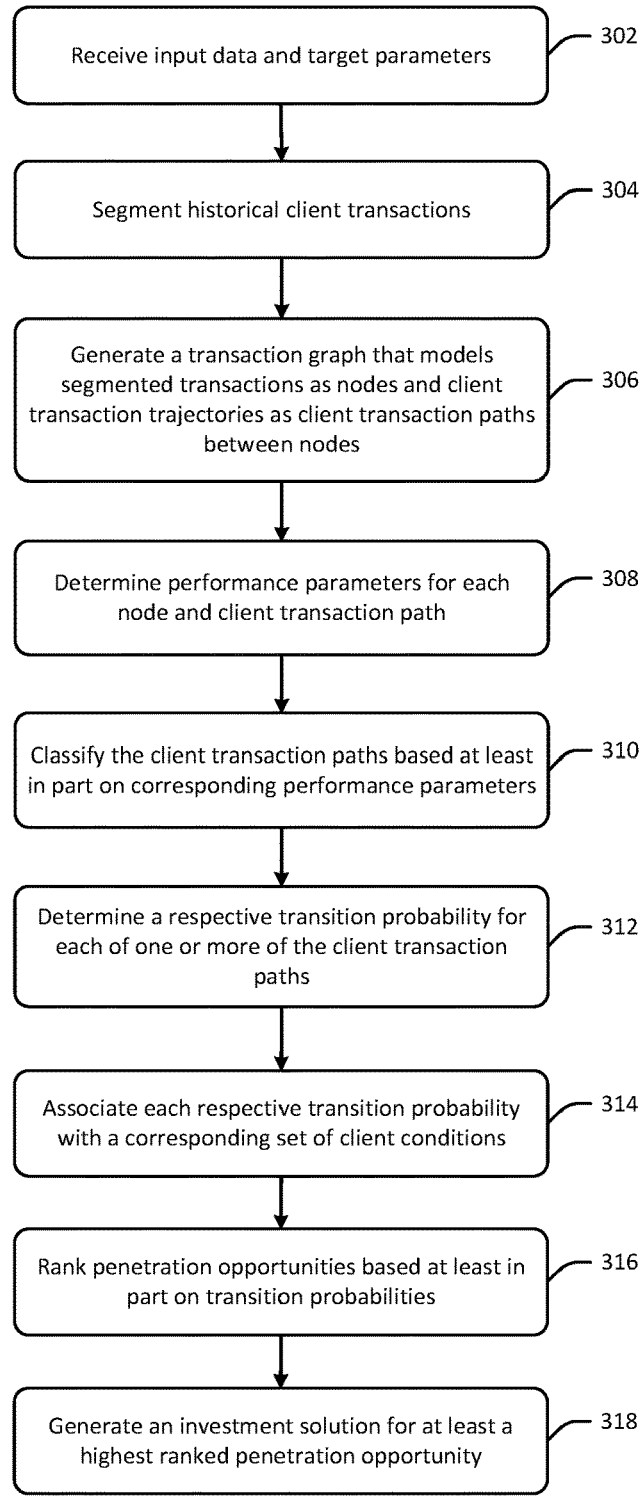
FIG. 3 is a process flow diagram of a method for determining an optimized investment solution with respect to an identified client penetration opportunity in accordance with one or more example embodiments of the disclosure.

FIG. 2 is a schematic block diagram illustrating various components of a system configured to determine an optimized investment solution with respect to an identified client penetration opportunity in accordance with one or more example embodiments of the disclosure. FIG. 3 is a process flow diagram of a method 300 for determining an optimized investment solution with respect to an identified client penetration opportunity in accordance with one or more example embodiments of the disclosure. FIGS. 2 and 3 will be described in conjunction with one another hereinafter.

One or more operations of the method 300 may be performed by one or more engines, or more specifically, by one or more program modules or sub-modules forming part of such engine(s). An engine, or more specifically, a module contained therein, which may itself contain or be a collection of one or more sub-modules, may include computer-executable instructions that when executed by a processing circuit may cause one or more operations to be performed. A processing circuit may include one or more processing units or nodes. Computer-executable instructions may include computer-executable program code that when executed by a processing unit may cause input data contained in or referenced by the computer-executable program code to be accessed and processed to yield output data. Any engine or module described herein may be implemented in any combination of software, hardware, and/or firmware.

Referring now to FIGS. 2 and 3, at block 302 of the method 300, a system 200 configured in accordance with example embodiments of the invention receives a variety of types of input data 204 and target parameters 202. The input data 204 may include sales data relating to completed transactions and RFQs from customers; production/service data such as data identifying hardware or software or service components, product/service categories, or product/service features relating to each completed transaction or RFQ; client data relating to, for example, credit worthiness of the client, financial condition of the client, client annual revenue, client payment history, client annual gross profit, or the like; and environment data such as data identifying an industry segment, data indicative of a client's industry position or indices, data indicative of a seller's industry position or indices, data indicative of information technology (IT) infrastructure and technology readiness of the client, or the like. The target parameters 202 may include, for example, a desired growth trajectory for the client, a desired profitability of the client, or the like.

At block 304 of the method 300, computer-executable instructions of one or more segmentation modules 206 are executed to segment historical client transactions and/or RFQs into different segments based on an evaluation of segmentation criteria. The segmentation criteria may be evaluated based on the input data 204 such as any of the sales data, production/service data, client data, and/or environment data described above and may specify segmentation based on client industry; product or service offerings relating to the RFQs and/or completed transactions; transaction amounts; or the like.

At block 306 of the method 300, computer-executable instructions of one or more transaction graph generation modules 214 are executed to generate a transaction graph 216 that models the segmented groups of transactions as nodes within the graph. In addition, at block 306 of the method 300, computer-executable instructions of one or more client transaction path determination modules 210 are executed to determine client transaction paths 212 within the transaction graph 216 that are representative of actual or potential client purchase trajectories. More specifically, the nodes in the transaction graph 216 may include nodes that are representative of product or service offerings associated with completed transactions for a customer, nodes that are representative of product or service offerings associated with RFQs that may not have resulted in completed transactions, and nodes representative of product or service offerings that constitute an upgrade, diversification, or penetration into a new market space as compared to an existing product or service offering for a customer.

FIG. 1 is a schematic depiction of an example transaction graph 100 in accordance with one or more example embodiments of the disclosure. The example transaction graph 100 includes a set of nodes and various client transaction paths indicative of potential customer life-cycle trajectories. The transaction graph 100 includes nodes representative of hardware offerings such as a node 102 representative of a basic hardware offering, a node 104 representative of a hardware system (System Y), and a node 106 representative of another hardware system (System Z). In certain example embodiments, System Y 104 may include additional hardware components, more complex hardware components, or the like as compared to the basic hardware 102. Similarly, System Z 106 may include additional hardware components, more complex hardware components, or the like as compared to System Y 104. In addition, in certain example embodiments, System Y may include software/services that are not included in the basic hardware offering, and System Z may include software/services that are not included in the System Y offering. The transaction graph 100 also includes nodes representing other types of offerings such as a node 108 representing a system software offering and a node 110 representing a cloud services offering. The transaction graph 100 may also include one or more additional nodes 112 representing any of a variety of other types of services.

The transaction graph 100 may further include a client transaction path 118 representative of a desired/potential trajectory in the life-cycle value for one or more customers. More specifically, the client transaction path 118 represents a potential trajectory in a customer-seller relationship that includes, for example, upgrading from the basic hardware offering represented by the node 102 to a system software offering represented by the node 108. The client transaction path 118 further includes a diversification from hardware and software offerings to a cloud services offering represented by node 110 as well as customer penetration into new market spaces and their corresponding service offerings represented by node 112.

In certain example embodiments, the client transaction path 118 may ultimately lead to the customer contracting for an offering of System Z (represented by node 106) which may reflect obtaining a target growth or profitability set by a seller for a customer. As previously noted, System Z may include an upgraded or diversified hardware/software/services offering as compared to offerings represented by other nodes in the transaction graph 100 such as the offering associated with System Y, or the offering associated with the system software, or the like. In certain example embodiments, alternate client transaction paths may ultimately lead to the same target offering (e.g., System Z). For example, an alternative client transaction path may cause the customer to upgrade from the basic hardware offering to the System Y offering via path 114, and then further upgrade from the System Y offering to the System Z offering via path 116. Further, in certain example embodiments, the customer life-cycle value may not follow a desired trajectory. For example, a customer may submit an RFQ to upgrade from the basic hardware offering to the System Y offering, but due to various client conditions may ultimately decide to remain with the basic hardware offering. This scenario is illustrated in FIG. 1 via the loop represented by the combination of paths 114 and 120.

Referring again to FIGS. 2 and 3 in conjunction with one another, at block 308 of the method 300, computer-executable instructions of one or more path classification modules 218 are executed to determine performance parameters for each node and client transaction path 212 in the transaction graph 216. The performance parameters may include, for example, seller profitability associated with an offering represented by a node in the transaction graph 216; an increase in seller profitability associated with a client transaction path 212 (or a portion of a client transaction path 212 between nodes representative of different product or service offerings); a metric indicative of the amount of diversification or penetration into a new market space associated with a client transaction path 212; and so forth. It should be appreciated that the above-described examples of performance parameters are merely illustrative and not exhaustive.

At block 310 of the method 300, computer-executable instructions of the path classification module(s) 218 are executed to classify the client transaction paths 212 based at least in part on the performance parameters determined at block 308 of the method 300. Classification of the client transaction paths 212 at block 310 may include identifying one or more critical client transaction paths associated with performance parameters desired by a seller. A critical client transaction path may be one that is indicative of a high-value penetration opportunity. A client transaction path may be determined to be indicative of a high-value penetration opportunity if, for example, the path is associated with one or more performance parameters that satisfy one or more threshold values. Such performance parameters may include, but are not limited to ordering frequency, purchase probability of each order, average revenue of each order, and profitability of each order. Depending on the implementation, a first value may satisfy a second value if the first value is greater than or equal to the second value or if the first value is less than or equal to the second value.

At block 312 of the method 300, one or more transition probability linking modules 222 receive the classified client transaction paths 220 as input, and computer-executable instructions of the transition probability linking module(s) 222 are executed to determine a respective transition probability for each client transaction path 220 that has been classified as being indicative of a high-value penetration opportunity. The transition probabilities may be probabilistic measures of the likelihood that the customer transitions from a current product or service offering to a different product or service offering that represents an upgrade or a diversification over the existing product or service offering or a penetration into a new market space. In certain example embodiments, the transition probability linking module(s) 222 may determine a respective transition probability for each classified client transaction path 220 regardless of its classification.

At block 314 of the method 300, computer-executable instructions of the transition probability linking module(s) 222 are executed to associate each respective transition probability determined at block 312 with a respective corresponding set of client conditions. As previously noted, the client conditions may include, without limitation, a relationship condition indicative of the customer's relationship with the seller; a finance condition indicative of the customer's financial condition; a technology condition indicative of the customer's technology resources; and an environment condition indicative of the industry segment in which the customer operates. Associating the transition probabilities with client conditions may include correlating the transition probabilities to data that includes metrics indicative of the client conditions. For example, for the relationship condition, a transition probability may be correlated to data indicative of the duration of the relationship between the customer and the seller, data indicative of the customer's satisfaction with the seller, etc. As another non-limiting example, for the finance condition, the transition probabilities may be correlated to data indicative of revenue, sales, earnings per share (EPS) or the like of the customer; data indicative of ordering frequency; and so forth. In certain example embodiments, each client condition may be scored for a given customer and a given classified client transaction path 220 (or segment of a path 220) with respect to a suitable scoring scale, and the transition probabilities may be correlated to these scores.

At block 316 of the method 300, computer-executable instructions of one or more opportunity ranking modules 224 are executed to rank penetration opportunities based at least in part on the corresponding transition probabilities to obtain a set of ranked penetration opportunities 226. Each penetration opportunity may correspond to a potential transition between two nodes along a corresponding client transaction path 220. For example, a penetration opportunity may correspond to an upgrade, diversification, or new market penetration from an existing product or service offering represented by a first node of a client transaction path 220 to a new product or service offering represented by a second node of the client transaction path 220.

At block 318 of the method 300, computer-executable instructions of one or more investment solution determination modules 228 are executed to select a highest ranked penetration opportunity among the ranked penetration opportunities 228 and an optimized investment solution 230 relating to the selected penetration opportunity is determined. More specifically, as previously noted, the respective transition probability associated with each ranked penetration opportunity 226 may be linked to a set of client conditions. The investment solution 230 that is generated for the selected penetration opportunity may include a recommendation to modify one or more client conditions linked to the selected penetration opportunity. For example, the investment solution may include a recommendation to the seller provide a loan, discount, or other financial incentive to improve the finance condition of the customer, and thus, increase the probability that the customer transitions to a higher-value product or service offering in accordance with the selected penetration opportunity. As another non-limiting example, the investment solution may include a recommendation to increase an investment in technology resources of the customer to increase the transition probability. As yet another non-limiting example, the investment solution may include a recommendation to offer a promotion of a higher-value product or service offering to incentivize the customer to continue along a desired life-cycle trajectory leading to a target growth and/or profitability for the seller with respect to the customer. The modification of the client condition(s) based on the investment solution 230 may increase the transition probability for the selected ranked penetration opportunity 226, thereby increasing the likelihood that the customer successfully transitions to the higher-value product or service offering associated with the selected ranked penetration opportunity 226.

Example embodiments of the invention include or yield various technical features, technical effects, and/or improvements to technology. For instance, example embodiments of the invention provide the technical effect of optimizing an investment solution to identify specific client condition(s) that can be altered to increase the likelihood that the customer transitions to a higher-value product or service offering in accordance with a selected penetration opportunity. This technical effect is achieved as a result of the technical features of generates a transaction graph containing nodes representative of product of service offerings (segmented transactions) and paths between the nodes (client transaction paths) representative of desired life-cycle trajectories of the customer; determining transition probabilities for client transaction paths in the transaction graph; correlating the transition probabilities to client conditions; ranking penetration opportunities based on corresponding transition probabilities; selecting a highest ranked penetration opportunity; and determining an investment solution that calls for modifying one or more client conditions to increase the transition probability, and thus, the likelihood that the customer takes advantage of the penetration opportunity and continues along the client transaction path (the desired trajectory of the customer's life-cycle value). Thus, the above-described technical features and their associated technical effect yield an improvement to conventional computer-based technologies for increasing a customer's life-cycle value by providing concrete guidance on client conditions that can be modified to increase the likelihood that a customer transitions to a higher-value product or service offering associated with a penetration opportunity, thereby optimizing the customer's life-cycle value in accordance with a desired client transaction path. It should be appreciated that the above examples of technical features, technical effects, and improvements to technology provided by example embodiments of the invention are merely illustrative and not exhaustive.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this disclosure.

Figure 4:
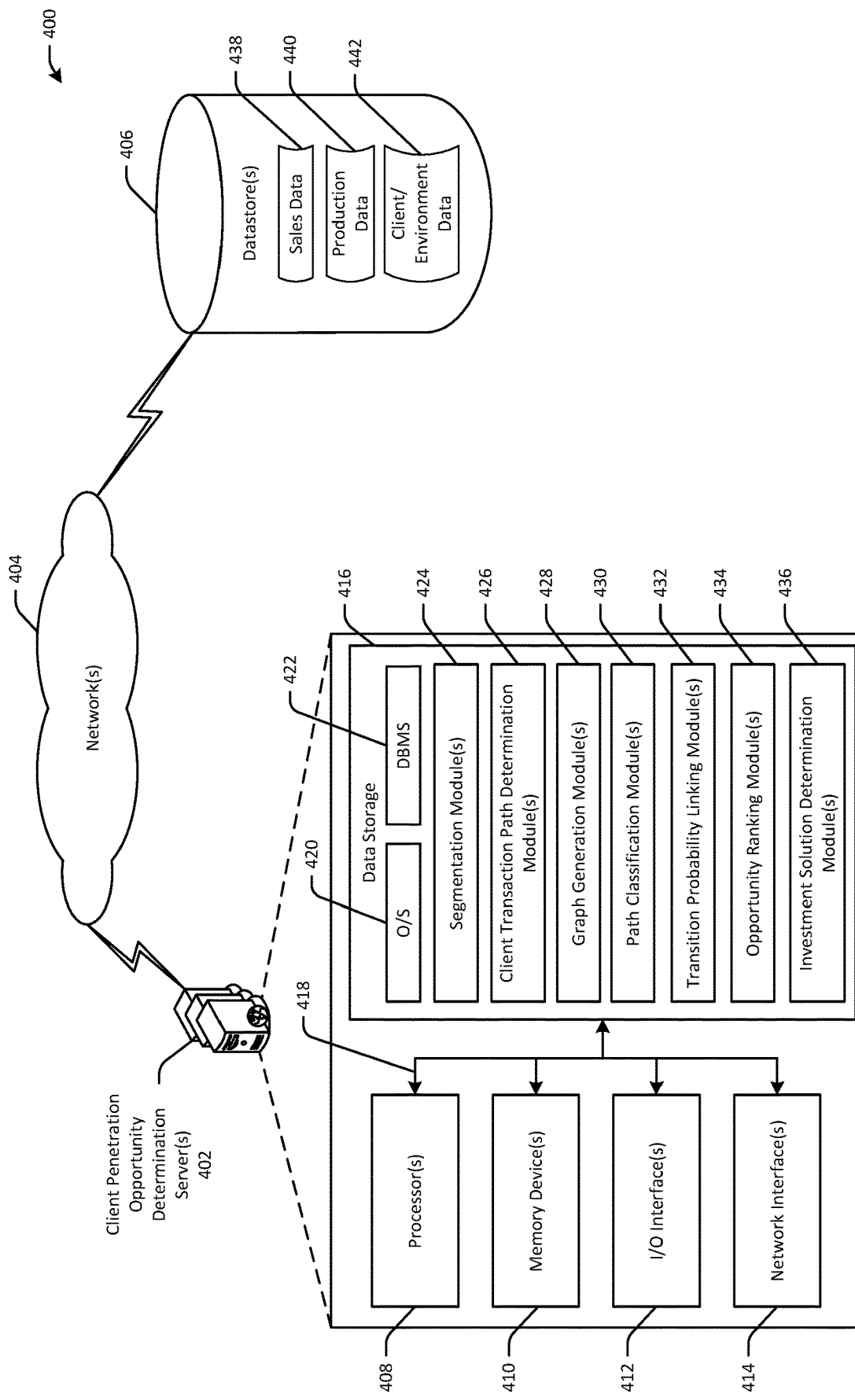
FIG. 4 is a schematic diagram of an illustrative networked architecture in accordance with one or more example embodiments of the disclosure.

FIG. 4 is a schematic diagram of an illustrative networked architecture 400 in accordance with one or more example embodiments of the invention in accordance with one or more example embodiments of the disclosure. The networked architecture 400 may include one or more client penetration opportunity determination servers 402. The server(s) 402 may represent, at least in part, the system 200 depicted in FIG. 2, in an illustrative configuration. The server(s) 402 may be configured to access one or more data stores 406 over one or more network(s) 404. While not depicted in FIG. 4, the server(s) 402 may also be configured to communicate with one or more other systems and/or devices via the network(s) 404. While the server(s) 402 may be described in the singular hereinafter for ease of explanation, it should be appreciated that multiple servers 402 may be provided and functionality described herein may be distributed across such multiple servers 402 in a distributed fashion.

The network(s) 404 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 404 may have any suitable communication range associated therewith and may include, for example, global networks (e.g., the Internet), metropolitan area networks (MANs), wide area networks (WANs), local area networks (LANs), or personal area networks (PANs). In addition, the network(s) 404 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 402 may include one or more processors (processor(s)) 408, one or more memory devices 410 (generically referred to herein as memory 410), one or more input/output ("I/O") interface(s) 412, one or more network interfaces 414, and data storage 416. The server 402 may further include one or more buses 418 that functionally couple various components of the server 402.

The bus(es) 418 may include at least one of a system bus, a memory bus, an address bus, or a message bus, and may permit exchange of information (e.g., data (including computer-executable code), signaling, etc.) between various components of the server 402. The bus(es) 418 may include, without limitation, a memory bus or a memory controller, a peripheral bus, an accelerated graphics port, and so forth. The bus(es) 418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 of the server 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 416 may include removable storage and/or non-removable storage including, but not limited to, magnetic storage, optical disk storage, and/or tape storage. The data storage 416 may provide non-volatile storage of computer-executable instructions and other data. The memory 410 and the data storage 416, removable and/or non-removable, are examples of computer-readable storage media (CRSM) as that term is used herein.

The data storage 416 may store computer-executable code, instructions, or the like that may be loadable into the memory 410 and executable by the processor(s) 408 to cause the processor(s) 408 to perform or initiate various operations. The data storage 416 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 416 for non-volatile storage.

More specifically, the data storage 416 may store one or more operating systems (O/S) 420; one or more database management systems (DBMS) 422 configured to access the memory 410 and/or one or more of the data stores 406; and one or more program modules, applications, engines, computer-executable code, scripts, or the like such as, for example, one or more segmentation modules 424, one or more client transaction path determination modules 426, one or more graph generation modules 428, one or more path classification modules 430, one or more transition probability linking modules 432, one or more opportunity ranking modules 434, and one or more investment solution determination modules 436. Any of the components depicted as being stored in data storage 416 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in this disclosure in connection with correspondingly named modules.

Although not depicted in FIG. 4, the data storage 416 may further store various types of data utilized by components of the server 402 (e.g., any of the data depicted in FIG. 4 as being stored in the datastore(s) 406). Any data stored in the data storage 416 may be loaded into the memory 410 for use by the processor(s) 408 in executing computer-executable instructions. In addition, any data stored in the data storage 416 may potentially be stored in the datastores 406 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, or the like of the server 402 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 416, the O/S 420 may be loaded from the data storage 416 into the memory 410 and may provide an interface between other application software executing on the server 402 and hardware resources of the server 402. More specifically, the O/S 420 may include a set of computer-executable instructions for managing hardware resources of the server 402 and for providing common services to other application programs (e.g., managing memory allocation among various application programs). In certain example embodiments, the O/S 420 may control execution of one or more of the program modules depicted as being stored in the data storage 416. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 416, and/or data stored in the data store(s) 406. The DBMS 422 may use any of a variety of database models (e.g., relational model, object model, etc.) and may support any of a variety of query languages. The DBMS 422 may access data represented in one or more data schemas and stored in any suitable data repository. The data store(s) 406 may store, for example, sales data 438, production/service data 440, and client/environment data 442, which may include any of the corresponding types of data previously described. The data store(s) 406 that may be accessible by the server 402 via the DBMS 422 may include, but are not limited to, databases (e.g., relational, object-oriented, etc.), file systems, flat files, distributed datastores in which data is stored on more than one node of a computer network, peer-to-peer network datastores, or the like. The data store(s) 406 may store various types of data including, without limitation, any of the types of data previously described. It should be appreciated that, in certain example embodiments, any external data store and/or any of the data residing thereon may additionally, or alternatively, be stored locally in the data storage 416.

Referring now to other illustrative components of the server 402, the input/output (I/O) interface(s) 412 may facilitate the receipt of input information by the server 402 from one or more I/O devices as well as the output of information from the server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 402 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 402 may further include one or more network interfaces 414 via which the server 402 may communicate with other platforms, networks, devices, data stores (e.g., data store(s) 406), and so forth. The network interface(s) 414 may enable communication, for example, via one or more of the network(s) 404.

It should be appreciated that the program modules depicted in FIG. 4 as being stored in the data storage 416 are merely illustrative and not exhaustive and that processing described as being supported by any particular program module may alternatively be distributed across multiple program modules or performed by a different program module. In addition, various program module(s), script(s), plug-in(s), Application Programming Interface(s) (API(s)), or any other suitable computer-executable code hosted locally on the server 402 and/or hosted on other computing device(s) accessible via one or more of the network(s) 404, may be provided to support functionality provided by the program modules depicted in FIG. 4 and/or additional or alternate functionality. Further, functionality may be modularized differently such that processing described as being supported collectively by a collection of program modules depicted in FIG. 4 may be performed by a fewer or greater number of program modules, or functionality described as being supported by any particular program module may be supported, at least in part, by another program module. In addition, program modules that support the functionality described herein may form part of one or more applications executable across any number of servers 402 in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the server 402 may include alternate and/or additional hardware, software, or firmware components beyond those described or depicted without departing from the scope of the disclosure. More particularly, it should be appreciated that software, firmware, or hardware components depicted as forming part of the server 402 are merely illustrative and that some components may not be present or additional components may be provided in various embodiments. While various illustrative program modules have been depicted and described as software modules stored in data storage 416, it should be appreciated that functionality described as being supported by the program modules may be enabled by any combination of hardware, software, and/or firmware. It should further be appreciated that each of the above-mentioned program modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular program module may, in various embodiments, be provided at least in part by one or more other program modules. Further, one or more depicted program modules may not be present in certain embodiments, while in other embodiments, additional program modules or modules not depicted may be present and may support at least a portion of the described functionality and/or additional functionality.

One or more operations of the method 300 may be performed by a server 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method 300 of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying a client penetration opportunity, the method comprising:
    segmenting historical client transactions;
    generating a transaction graph comprising nodes representative of the segmented historical client transactions and nodes representative of product or service offerings based at least in part on a client request for quotes (RFQs) that constitute an upgrade, diversification, or penetration into a new market space as compared to an existing product or service offering for a client, the transaction graph further comprising client transaction paths between the nodes, wherein the transaction graph further comprising a loop, the loop including at least two client transaction paths between corresponding nodes, that indicates the client remained with a current offering after submitting the RFQ,
    wherein a client transaction path of the client transaction paths is a target trajectory of a life-cycle for a customer, wherein the targeted trajectory is displayed on the transition graph;
    determining a respective transition probability for each client transaction path in at least a subset of the client transaction paths, wherein each client transaction path is classified based on performance parameters for each node of the transaction graph;
    determine information associated with a pending transaction for a client;
    ranking penetration opportunities associated with the at least a subset of the client transaction paths based at least in part on each respective transition probability, wherein ranking the penetration opportunities further comprises ranking the penetration opportunities based at least in part on the information associated with the pending transaction for the client; and
    selecting a highest ranked client penetration opportunity from the ranked client penetration opportunities;
    in response to selecting the highest ranked client penetration opportunity from the ranked penetration opportunities, generating, using a hardware investment solution determination module, an investment solution for the client penetration opportunity,
    wherein the method is performed by at least one computing device.

2. The computer-implemented method of claim 1, wherein selecting the client penetration opportunity comprises selecting the highest ranked penetration opportunity associated with a largest respective transition probability.

3. The computer-implemented method of claim 1, wherein the client penetration opportunity is an opportunity to upgrade a client to a product or service that provides increased profitability, and wherein the respective transition probability corresponding to the client penetration opportunity is a probability of upgrading the client to the product or service.

4. The computer-implemented method of claim 1, further comprising:
    associating each respective transition probability with a respective corresponding set of client conditions, wherein the investment solution comprises a modification to at least one client condition associated with the respective transition probability corresponding to the client penetration opportunity.

5. The computer-implemented method of claim 4, wherein the modification to the at least one client condition causes the respective transition probability corresponding to the client penetration opportunity to increase.

6. The computer-implemented method of claim 1, wherein the client transaction paths comprise potential client transaction trajectories that include at least one of: an upgrade of a product or service offering, diversification of the product or service offering, or penetration into a new market space.

* * * * *